UNITED STATES PATENT OFFICE.

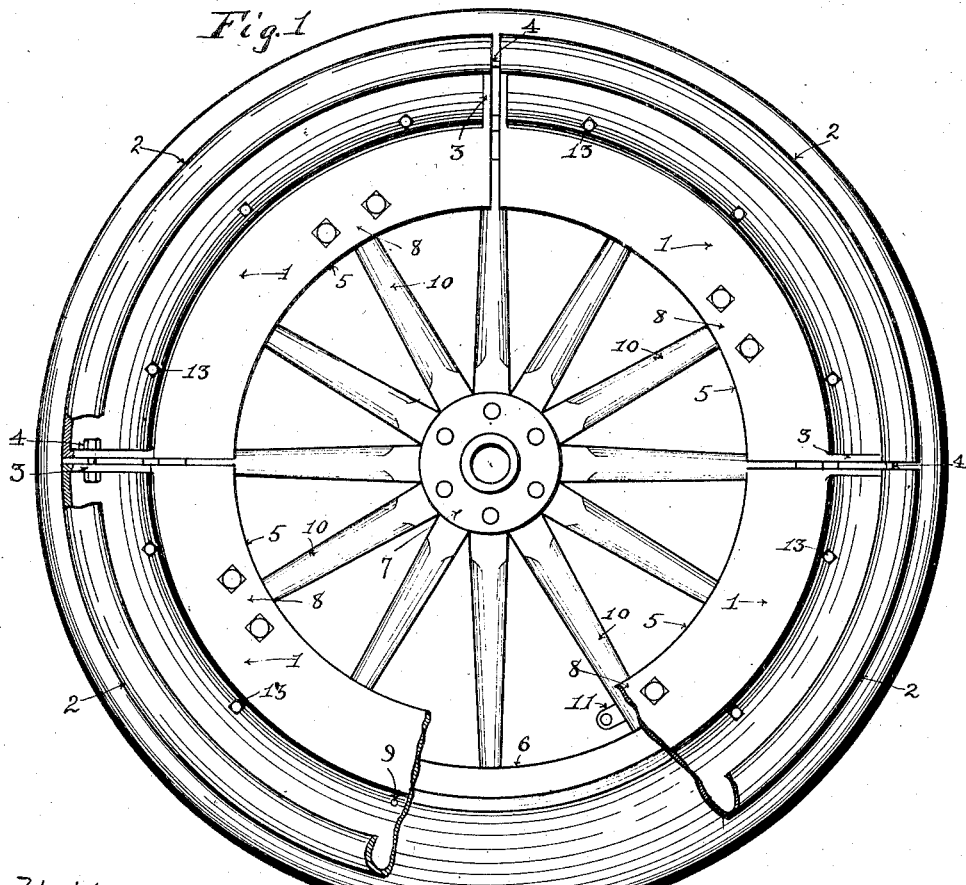

FRANCIS G. CRONE, OF BUFFALO, NEW YORK.

TIRE-PROTECTOR.

No. 902,276.  Specification of Letters Patent.  Patented Oct. 27, 1908.

Application filed September 11, 1905. Serial No. 277,959.

*To all whom it may concern:*

Be it known that I, FRANCIS G. CRONE, a citizen of the United States, residing at Buffalo, in the county of Erie and State of New York, have invented a new and useful Tire-Protector, of which the following is a specification.

My invention relates to pneumatic tire protectors or creepers.

My chief objects have been to provide means, readily attachable to any pneumatic tire wheel, which can be used in case the tire is punctured or defective to protect it from being rim cut; also to provide means for preventing the tire from creeping on slippery or icy roads.

Referring now to the accompanying drawings consisting of one sheet and two figures in which like characters of reference indicate corresponding parts throughout the several views: Figure 1 is an elevation of a wheel equipped with my invention. Fig. 2 is an edge view partly in section of a wheel equipped with the same.

Attached to the wheel shown in Fig. 1 are four sections showing my tire protector. While I am not necessarily confined to said number of sections, I find four to be the preferable number.

1 is a pressed oval strip of metal having a roll 2 and provided with a lug 3 through which a bolt 4 may pass to secure it to a corresponding, adjoining section. The depending flange 5 projects below the face of the rim 6 of the wheel 7 so that at any suitable point or points 8, bolt holes 9 may be provided. The bolt holes are so placed that when the tire protector 1 is in its proper position the two adjoining holes will be on opposite sides of a spoke 10 and bolts passing through such holes will engage with a strap 11 and when screwed in position firmly hold the protector in place against the rim 6 and tire 12 of the wheel 7.

For the purpose of more rigidly holding the protector 1 in place, I provide set screws 13 which may be forced against the rim 6 and hold the said rim and protector firmly in place.

It is apparent from the foregoing description of my invention that the sections of my protector can readily be attached to any wheel and that when so attached they will bear the weight of the load exerted on the wheel whenever the pneumatic tire is deflated to any predetermined degree. Manifestly my protector may be so regulated that it will at all times bear all the weight of the superimposed load or it may bear only a part of it which it may share with the tire whether the tire be pneumatic or solid. Thus my invention may be kept attached to the wheel at all times and not be used or it may readily be attached and detached as desired.

It will be evident that when a wheel provided with my improvement tends to skid, as the tread point of the tire is rolled slightly to one side by the lateral pressure due to the skidding movement of the vehicle, the tire is flattened at the tread point to a sufficient extent to permit the periphery of the protector to engage against the pavement or roadway and thus check the tendency to skid.

By means of my invention therefore I am able to prevent pneumatic tires from being rim cut and thus I greatly lengthen the life of the tire in addition to being able by means of a very simple and readily attachable and detachable device, to prevent the wheels from skidding or creeping.

From the foregoing it will be evident that the protectors may be moved back and forth on the spokes of the wheel and thus within certain limits be placed in any predetermined relation with the tire of the wheel.

Having thus described my invention, what I claim is:

1. The combination with a vehicle wheel and a tire attached thereto of a tire protector comprising a plurality of circular plates provided with peripheral tread surfaces and means for rigidly securing said plates to said wheel so that the periphery of said plates may bear any predetermined relation to the periphery of said tire.

2. The combination with a vehicle wheel and a tire attached thereto of a tire protector comprising segmental circular plates, the segments having similar outwardly and inwardly curved rims to form a tread, and depending flanges and means for securing said flanges to the spokes of the wheel.

3. The combination with a vehicle wheel and a tire attached thereto of a plurality of segmental, circular tire protectors, the segments having similar outwardly and inwardly curved rims to form a tread, depending flanges and straps and bolts for securing said flanges at their ends with each other and with the spokes of the wheel, lugs on the ends of said segments and bolts uniting said lugs to rigidly secure said segments to each other.

4. The combination with a vehicle wheel a rim and a tire attached thereto of a tire protector comprising an outside rim, a depending flange, means for rigidly securing said protector to the spokes of said wheel and set-screws threaded through said protector and bearing against the tire rim to further secure the protector to the wheel.

In testimony whereof, I have hereunto set my hand in the presence of two witnesses.

FRANCIS G. CRONE.

Witnesses:
    EDWARD B. BOSLEY,
    E. A. KELLY.